Figure 1:
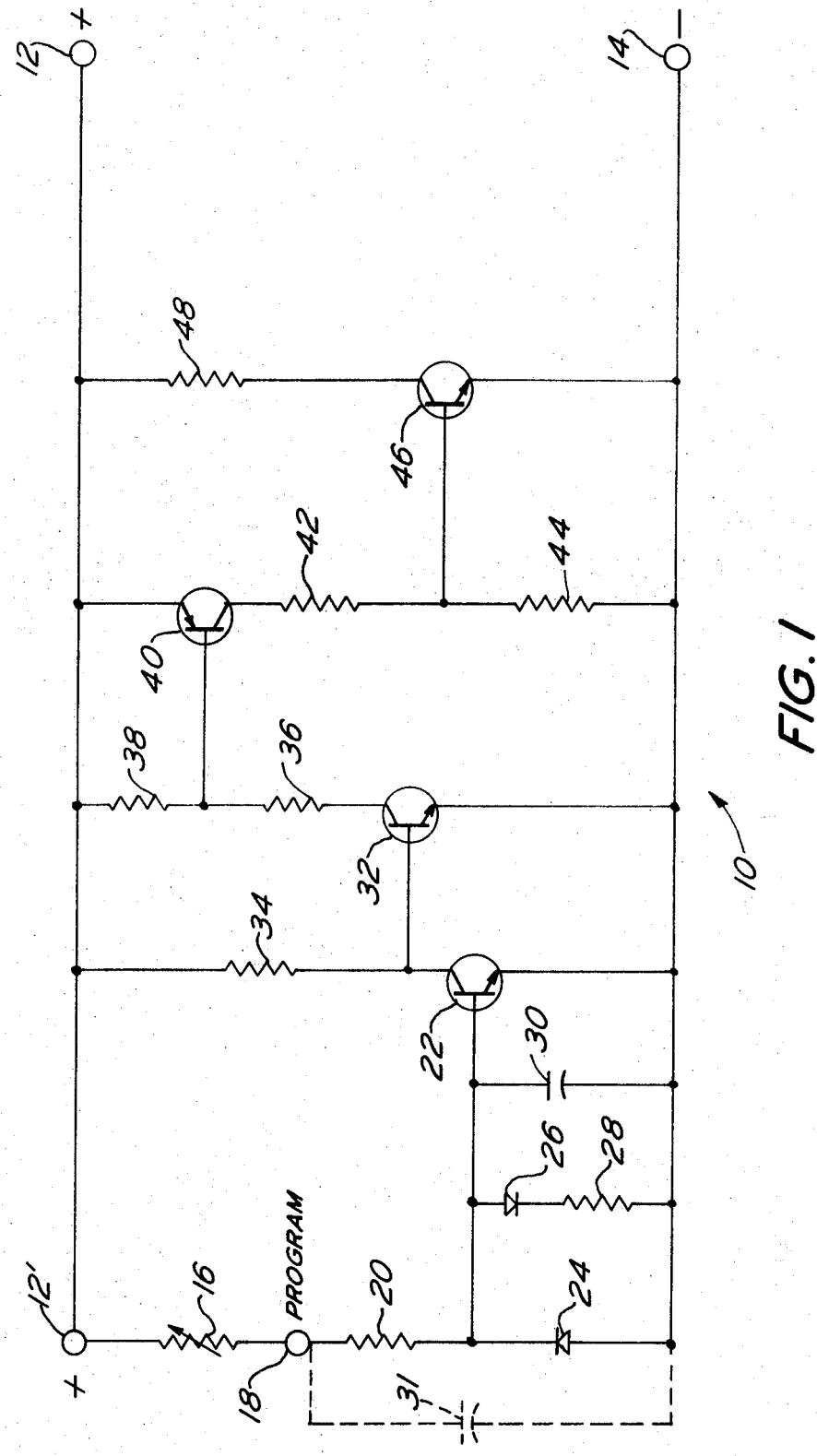

United States Patent [19]
York

[11] 3,851,218
[45] Nov. 26, 1974

[54] DIRECT CURRENT SOLID STATE CIRCUIT BREAKER

[75] Inventor: Robert A. York, Mechanicsburg, Pa.

[73] Assignee: Flight Systems, Inc., Mechanicsburg, Pa.

[22] Filed: July 2, 1973

[21] Appl. No.: 375,428

[52] U.S. Cl. ............ 317/33 R, 317/36 TD, 317/54
[51] Int. Cl. ............................................. H02h 3/08
[58] Field of Search ............... 317/33 R, 36 TD, 54

[56] References Cited
UNITED STATES PATENTS

| | | | |
|---|---|---|---|
| 3,591,832 | 7/1971 | Pelka | 317/33 R |
| 3,654,518 | 4/1972 | Phelps et al | 317/33 R |

*Primary Examiner*—James D. Trammell
*Attorney, Agent, or Firm*—Seidel, Gonda & Goldhammer

[57] ABSTRACT

A direct current solid state circuit breaker requires only two terminals to be connected into the direct current circuit, and the current value at which the breaker interrupts the circuit can be varied. The circuit breaker generates a voltage that is proportional to the circuit current. This voltage is used to control a solid state switch that is used to interrupt the circuit. Turn-off time is enhanced by feedback of the voltage in a regenerative manner.

4 Claims, 2 Drawing Figures

DIRECT CURRENT SOLID STATE CIRCUIT BREAKER

This invention relates to a direct current solid state circuit breaker. More particularly, the present invention relates to a direct current solid state circuit breaker which requires only two terminals to be connected into the direct current circuit and which interrupts the circuit at a programmable current value.

Direct current solid state circuit breakers, per se, are known in the art. Among such known circuit breakers is the one disclosed in U.S. Pat. No. 3,654,518 issued Apr. 4, 1972 for Fast Acting Solid State Circuit Breaker. The major advantages of solid state circuit breakers are that they are inherently faster acting than electromechanical circuit breakers and they are not subject to mechanical wear. The present invention seeks to further improve the advantages gained by using solid state circuit breakers. As used herein, the term "solid state circuit breaker" is meant to define a circuit breaker that is made wholly of solid state devices.

The present invention improves upon known solid state circuit breakers for D-C circuits by providing a circuit breaker that can be connected into the circuit using only two terminals. Another advantage and improvement of the present invention is that the current value at which the circuit breaker interrupts the direct current circuit can be programmed. Moreover, it can be readily programmed by merely changing the value of a resistor within a given range. Another advantage of the present invention is that the circuit breaker can serve as a remote programmed on-off switch. Moreover, it can be remotely located and there is no need for a human being to recognize that it is tripped or to reset it. The present invention also retains the other advantages of solid state circuit breakers such as being impervious to shock and vibration. Still further, the present invention improves upon the turn-off time of existing circuit breakers by providing a device that interrupts the circuit in 50 microseconds at 133 percent overload with no external capacitance. Other advantages of the present invention will be apparent from what is described hereinafter.

For the purpose of illustrating the invention, there are shown in the drawings forms which are presently preferred; it being understood, however, that this invention is not limited to the precise arrangements and instrumentalities shown.

FIG. 1 schematically illustrates a direct current solid state circuit breaker in accordance with the present invention.

Figure 2:
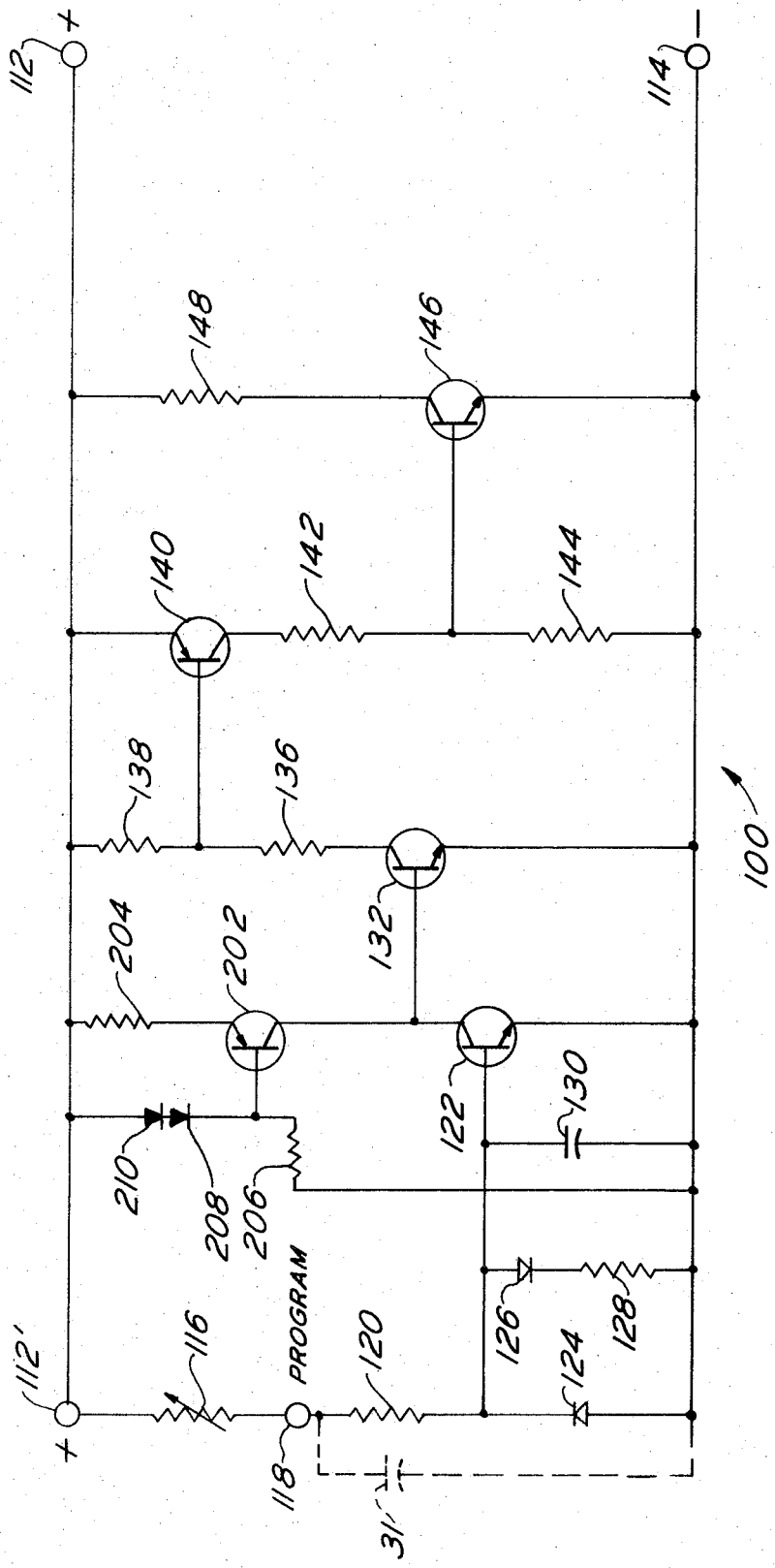

FIG. 2 schematically illustrates another direct current solid state circuit breaker in accordance with the present invention.

Referring now to the drawing in detail, wherein like numerals indicate like elements, there is shown a direct current solid state circuit breaker designated generally as 10.

The circuit breaker includes a positive terminal 12 for connection to a positive lead in the circuit to be controlled and a negative terminal 14 for connection to a negative lead in the circuit. One of the advantages of the present invention is that the load can be common to the supply (positive) or common to the return (negative) lead. Accordingly, the circuit breaker is not shown connected to any particular type of load and supply, it being assumed that they will be appropriate to the specifications for the circuit as hereinafter set forth.

As previously indicated, the current value at which the direct current circuit is interrupted is programmable. Such programming is accomplished by connecting a resistor 16 between the positive terminal 12' and the program terminal 18. Terminal 12' is shown as a separate terminal in the drawing. However, it should be understood that a circuit breaker manufactured in accordance with what is described herein would physically have only one terminal 12 since terminal 12 and 12' are common. Resistor 16 is shown as being variable. It should be understood, however, that in operation it may be a fixed value resistor. The purpose in showing it as a variable resistor is to indicate that it can be changed or programmed according to the needs of the user.

Resistor 20 is connected between program terminal 18 and the base of NPN transistor 22 as shown. Resistor 20 serves to prevent damage to the circuit by an inadvertent short across positive terminal 12' and program terminal 18.

The cathode of diode 24 is connected to the base of transistor 22 and one terminal of the resistor 20. The anode of diode 24 is connected to the negative side of the circuit as shown. The anode of diode 26 is connected to the base of transistor 22. The cathode of diode 26 is connected to resistor 28 which in turn is connected to the negative side of the circuit as shown. The function of diode 26 and resistor 28 is to correct for variations in transistor 22 due to changes in temperature. In particular, diode 26 and resistor 28 compensate the temperature coefficient of the base-emitter voltage of transistor 22. This is accomplished by current sharing between the base of transistor 22 and diode 26. The temperature compensating effect is also indirectly felt throughout the entire circuit breaker 10 so that the entire device has a flat temperature characteristic.

Diode 24 isolates the base of transistor 22 from the negative voltage and prevents damage from such voltage to the transistor.

A capacitor 30 may be connected between the base of transistor 22 and the negative side of the circuit. Capacitor 30 functions to prevent transistor 22 from conducting instantaneously when the voltage between terminal 12' and the base of the transistor reaches the value determined by resistor 16. Capacitor 30 also serves to assure that transistor 22 latches into a conducting condition once it does commence conduction.

If desired, an external capacitor 31 can be connected between terminal 14 and program terminal 18. The function of the external capacitor 31 is to increase the time required for interrupting the circuit and to provide a means to handle loads with high inrush currents such as direct current motors and incandescent lamps. For example, small direct current motors may have an inrush current as much as two and a half times the running current. Accordingly, the capacitor 31 prevents tripping when the motor starts up.

The collector of transistor 22 is connected in common with the base of NPN transistor 32 to the resistor 34. Resistor 34 is connected to the positive side of the circuit as shown. Its function is to provide a current source for the base emitter circuit of transistor 32 and the collector-emitter circuit of transistor 22 when it commences conduction. The emitters of transistors 22 and 32 are connected in common to the negative side of the circuit. The collector of transistor 32 is connected to resistor 36 which is connected in common with one terminal of resistor 38 and the base of PNP transistor 40. The other terminal of resistor 38 is connected to positive terminal 12. The emitter of transistor 40 is connected to the positive side of the circuit. The collector of transistor 40 is connected to resistor 42 which is connected in common with resistor 44 to the base of NPN transistor 46. The other terminal of resistor 44 is connected to the negative side of the circuit as is the emitter of transistor 46. The collector of transistor 46 is connected to resistor 48 which, as shown, is connected to the positive side of the circuit.

Since the circuit breaker 10 is a two terminal device, all current flowing through the direct circuit being controlled must flow through the circuit from positive terminal 12 to negative terminal 14. Accordingly, a voltage is developed across resistor 48 and transistor 46. This voltage is linearly proportional to the direct current flowing through the circuit being controlled. Most of the voltage drop is across resistor 48. However, a small non-linear voltage drop also occurs between the emitter-collector terminals of transistor 46. This voltage which appears across terminals 21 and 14 and which is proportional to the current flowing through the circuit necessarily also appears across the resistors 16 and 20 since they are connected in series. Accordingly, a voltage equal to the voltage between terminals 12 and 14 is applied to the base of transistor 22. As the current flowing through the circuit increases, the voltage drop will increase and the more positive voltage will be applied to the base of transistor 22. When this voltage reaches a preset value as determined by the value selected for resistor 16, transistor 22 will conduct.

When transistor 22 commences conducting, it takes current away from the base of transistor 32 and hence the collector-emitter circuit of transistor 32 starts to turn off or become non-conductive. As transistor 32 becomes non-conductive, the voltage at the base of transistor 40 becomes more positive and hence it commences to turn off thereby making the voltage at the base of transistor 46 more negative and it too commences to cease conduction or turn off. Once transistor 46 has ceased conducting, the circuit being controlled is interrupted and will remain in that condition until the circuit 10 is reset by a momentary interruption in the power from the voltage source.

From the foregoing, it can be seen that as transistor 46 begins to turn off, the voltage between the terminals 12 and 14 is going to increase. Consequently, the voltage between terminal 12' and the base of transistor 22 is also going to increase. This increase in voltage is therefore going to aid in turning off the transistors in the manner described and therefore decreases the time required to interrupt the direct current circuit being controlled in a regenerative manner. Of course, the regenerative effect is coupled directly through the cascaded transistors 22, 32 and 40 to the basic transistor 46. Transistor 46 in effect functions as a solid state switch which is controlled by the aforesaid voltages and regenerative effect.

Having described the functional operation of the circuit breaker 10, there will now be set forth a specific example of the circuit elements for such circuit. It should be understood, however, that this specific example is not intended to limit the invention, it being understood that it is by way of example and that those skilled in the art will recognize how to modify the values given in the light of what is disclosed herein. Accordingly, by way of example, but not limitation, a circuit may be constructed to effect the invention in the following manner:

Transistors
22 — 2N3904
32 — 2N3904
40 — 2N4403
46 — 2N5192

Diodes
24 — 1N4148
26 — 1N4148

Capacitor
30 — .01 micro-Farads (150V)

Resistors
Unless otherwise specified, all resistors are ±5% and .25 Watt.
16 — variable 9K to 2.5K ohms
20 — 2.2K ohms
28 — 6.8K ohms
34 — 15K ohms
36 — 330 ohms
38 — 5.6K ohms
42 — 4.7 ohms
44 — 330 ohms
48 — 1 ohm; 3 Watt (wire wound)

A circuit constructed in accordance with the foregoing table of values will perform to the following specifications:

The programmable range at which the circuit will be interrupted is 0.75 amps to 1.75 amps by varying the resistance 16 from 9K ohms to 2.5K ohms.

The turn-off time or time required to interrupt the circuit is 50 microseconds for a 133 percent overload without capacitor 31. The amount of interrupt time increases exponentially as the percent of overload decreases and descreases exponentially as the percentage of overload increases.

In-rush delay time or the time required to interrupt the circuit can be increased by increasing the value of capacitor 31 from 0.1 micro-Farads to approximately 60 micro-Farads with a resultant increase in time from 0.4 milliseconds to 200 milliseconds. The voltage drop across the terminals 12 and 14 when the circuit breaker 10 is in an "on" condition is approximately 1.0 volts direct current with a two volt direct current maximum. Leakage current when the circuit is interrupted is approximately 5 mill-amps maximum at 35 volts direct current. The operating voltage range is 10 volts direct current minimum to 35 volts maximum.

The operating temperature range is −20° C. to +71° C. with a trip point coefficient of 0.15 percent per degree C. maximum.

A circuit constructed in accordance with the foregoing has several uses and applications. Among these is that the load may be connected in either the supply or return lead.

Referring now to FIG. 2, there is shown yet another embodiment of the present invention designated as 100. Since most of the circuit elements of the embodiment illustrated in FIG. 2 are the same as those illustrated in FIG. 1 and have the same function as well, they will not be described in detail. Instead, they have been marked with like numerals except that a one hundreds digit has been added in front of them; thus, for example, transistor 122 in the embodiment of FIG. 2 is the same as transistor 22 in the embodiment of FIG. 1.

Inspection of the embodiment in FIG. 2 will show that the circuit breaker 100 is the same as the circuit breaker 10 except the resistor 34 has been eliminated and those circuit elements designated by a three digit number beginning with the numeral 2 substituted in its place.

Thus, the circuit breaker 100 further includes the NPN transistor 202. The emitter of transistor 202 is connected through resistor 204 to positive terminal 112. The collector of transistor 202 is connected to the common junction of the collector of transistor 122 and the base of transistor 132. The base of transistor 202 is connected to the cathode of diode 208 whose anode is connected in series with the cathode of diode 210. The anode of diode 210 is connected to positive terminal 112. The base of transistor 202 is connected to one terminal of resistor 206 which in turn is connected to negative terminal 114. The aforesaid circuit for transistor 202 is to function as a single transistor current source. It will be recalled that resistor 34 in the embodiment of FIG. 1 also functions as a current source. However, such a resistor current source is limited because it functions only for low source voltages and provides no significant range of source voltages either. On the other hand, the transistor current source 202 provides a much wider range of system or source voltage with low current leakage in the trip state. A fixed resistor, such as resistor 34, will draw some current but with the transistor, the source current becomes nearly independent of the voltage.

The circuit breaker 100 of FIG. 2 functions the same as the circuit breaker 10 of FIG. 1 and therefore need not be again described in detail. Moreover, the circuit elements bearing the aforesaid relationship are the same and therefore the specific example need not be repeated. Instead, only the new elements are described in the following specific example, it being understood that all unidentified elements are the same as those for FIG. 1.

| Transistor | |
|---|---|
| 202 — 2N3905 | |
| Diodes | |
| 208 — 1N4148 | |
| 210 — 1N4148 | |
| Resistors | |
| 204 — 360 ohms | |
| 206 — 39K ohms | |

A circuit constructed in accordance with the foregoing principles, whether derived from the embodiment of FIG. 1 or the embodiment of FIG. 2, is capable of operating over a range of currents from 1 milliampere to 30 amps and from approximately 3 volts to approximately 500 volts, depending upon the choice of semiconductor devices and other circuit components. The choice of circuit elements should be independent from the circuit configuration. The upper limit of load current which can be controlled is determined in large part by the ability of transistors 46 (146) and 48 (148) to dissipate heat.

The present invention may be embodied in other specific forms without departing from the spirit or essential attributes thereof and, accordingly, reference should be made to the appended claims, rather than to the foregoing specification as indicating the scope of the invention.

I claim:
1. A direct current circuit breaker for interrupting a direct current circuit when the current exceeds a programmable value, said circuit breaker using only solid state devices and comprising:
   a positive terminal and a negative terminal for connecting said circuit breaker in the direct current circuit to be controlled, said positive terminal and negative terminal being the only two terminals for connecting the circuit breaker into the direct current circuit;
   said circuit breaker being adapted so that a load may be connected common to either the positive or negative terminal of said circuit breaker;
   first means for generating a voltage drop including a solid state switch connected in series between said positive and negative terminals and through which the current being controlled normally flows;
   programmable voltage drop means connected in circuit with said first voltage drop means for generating a voltage drop equal to the voltage drop across said first voltage drop means said programmable voltage drop means being changeable within a range to change the value of the current at which said circuit breaker will interrupt the direct current circuit;
   solid state means to control whether said solid state switch is conductive or non-conductive, said solid state control means including solid state devices responsive to the voltage drop across the programmable voltage drop means;
   said solid state control means including a current source, said current source normally providing current for biasing said solid state devices to maintain said solid state switch in a conductive condition;
   said solid state means being connected to be responsive to the voltage drop across said programmable voltage drop means for diverting the biasing current from said solid state devices when the voltage drop exceeds a predetermined value to thereby make said solid state switch non-conductive; and
   said programmable voltage drop means and said solid state devices being connected to form a regenerative circuit for enhancing the turn-off time of said solid state switch.

2. A direct current circuit breaker in accordance with claim 1 wherein said solid state switch is a transistor and said solid state devices are transistors connected in cascade.

3. A direct current circuit breaker in accordance with claim 1 wherein said programmable voltage drop means is a changeable resistor and said first means for generating a voltage drop is a resistor connected in series with a transistor, said transistor being the solid state switch.

4. A direct current circuit breaker in accordance with claim 3 wherein:
   said current source includes a resistor connected in series with a transistor, the base terminal of said transistor being connected to one terminal of said programmable voltage drop means;
   said current source being connected to said solid state devices for normally biasing said solid state devices to maintain said solid state switch in a conductive condition;
   said transistor connected in series with said current source being biased to a conductive condition when the voltage drop across said programmable voltage drop measn exceeds a predetermined value to divert current from said solid state devices to render said solid state switch non-conductive.

* * * * *